(12) United States Patent
Oguma et al.

(10) Patent No.: US 10,597,027 B2
(45) Date of Patent: Mar. 24, 2020

(54) CONTROL APPARATUS OF HYBRID VEHICLE

(71) Applicant: Mitsubishi Jidosha Kogyo Kabushiki Kaisha, Tokyo (JP)

(72) Inventors: Takahiro Oguma, Tokyo (JP); Shigetoshi Hirano, Tokyo (JP); Wataru Matsumura, Tokyo (JP); Shingo Sonoda, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 204 days.

(21) Appl. No.: 15/718,680

(22) Filed: Sep. 28, 2017

(65) Prior Publication Data
US 2018/0086333 A1 Mar. 29, 2018

(30) Foreign Application Priority Data
Sep. 29, 2016 (JP) .................. 2016-191611

(51) Int. Cl.
*B60W 20/20* (2016.01)
*B60K 6/442* (2007.10)
(Continued)

(52) U.S. Cl.
CPC ............ *B60W 20/20* (2013.01); *B60K 6/442* (2013.01); *B60W 10/06* (2013.01); *B60W 10/08* (2013.01);
(Continued)

(58) Field of Classification Search
CPC ...... B60W 20/20; B60W 20/16; B60W 10/06; B60W 10/08; B60W 10/26;
(Continued)

(56) References Cited

U.S. PATENT DOCUMENTS 6,829,887 B2 * 12/2004 Suzuki ................... B60K 6/445
180/65.235
6,895,744 B2 * 5/2005 Osawa ................... B60K 6/445
60/274
(Continued)

FOREIGN PATENT DOCUMENTS

JP 2010-83394 A 4/2010
JP 2012-131240 A 7/2012
(Continued)

OTHER PUBLICATIONS

Extended European Search Report dated Dec. 20, 2017 in corresponding European Application No. 17193533.1.
(Continued)

*Primary Examiner* — Nicholas Kiswanto
(74) *Attorney, Agent, or Firm* — Birch, Stewart, Kolasch & Birch, LLP

(57) ABSTRACT

A control apparatus of a hybrid vehicle which, when a travel mode is switched from a second mode (EV mode) to a first mode (series mode), can warm an exhaust purification catalyst appropriately to suppress deterioration of an exhaust gas, is provided. The control apparatus comprises selection means 32 which selects the first mode as a travel mode of a vehicle 10, if a required output is equal to or higher than a determination threshold value, or selects the second mode, if the required output is lower than the determination threshold value; and threshold value changing means 33 which lowers the determination threshold value, if the temperature of the exhaust purification catalyst is lower than a predetermined temperature.

18 Claims, 6 Drawing Sheets

(51) Int. Cl.
  *B60W 20/16* (2016.01)
  *B60W 10/06* (2006.01)
  *B60W 10/08* (2006.01)
  *B60W 10/26* (2006.01)
(52) U.S. Cl.
  CPC ............ *B60W 10/26* (2013.01); *B60W 20/16* (2016.01); *B60W 2510/068* (2013.01); *B60W 2510/244* (2013.01); *B60W 2510/246* (2013.01); *B60W 2510/248* (2013.01); *Y02T 10/54* (2013.01); *Y02T 10/6234* (2013.01); *Y02T 10/6286* (2013.01); *Y10S 903/93* (2013.01)
(58) Field of Classification Search
  CPC ..... B60W 2510/068; B60W 2510/244; B60W 2510/246; B60W 2510/248; B60K 6/442; Y02T 10/54; Y02T 10/6234; Y02T 10/6286; Y10S 903/93
  See application file for complete search history.

(56) References Cited

U.S. PATENT DOCUMENTS

| | | | |
|---|---|---|---|
| 8,751,081 B2* | 6/2014 | Kato | B60K 6/445 701/22 |
| 8,904,761 B2 | 12/2014 | Amano | |
| 9,834,202 B2* | 12/2017 | Takara | B60W 20/40 |
| 9,856,829 B2* | 1/2018 | Leone | B60K 6/365 |
| 9,909,512 B2* | 3/2018 | Asami | B60W 20/16 |
| 9,925,974 B2* | 3/2018 | Leone | B60W 10/06 |
| 2006/0180362 A1 | 8/2006 | Yamaguchi et al. | |
| 2010/0058737 A1* | 3/2010 | Harada | B60K 6/445 60/273 |
| 2012/0072063 A1 | 3/2012 | Kato et al. | |
| 2013/0025263 A1 | 1/2013 | Amano | |
| 2014/0297088 A1* | 10/2014 | Ando | B60K 6/445 701/22 |
| 2017/0130635 A1* | 5/2017 | Smith | B60W 50/0097 |
| 2018/0086334 A1* | 3/2018 | Oguma | B60K 6/442 |

FOREIGN PATENT DOCUMENTS

| | | |
|---|---|---|
| JP | 2013-24223 A | 2/2013 |
| JP | 2013-133040 A | 7/2013 |
| JP | 2016-037252 A | 3/2016 |
| WO | WO 2010/134163 A1 | 11/2010 |

OTHER PUBLICATIONS

Office Action issued in the corresponding Japanese Patent Application No. 2016-191611, dated Feb. 5, 2020, with a Machine English translation thereof.

* cited by examiner

UPPER LIMIT OUTPUT POWER (Ph)

CONTROL APPARATUS OF HYBRID VEHICLE

The entire disclosure of Japanese Patent Application No. 2016-191611 filed on Sep. 29, 2016 is expressly incorporated by reference herein.

TECHNICAL FIELD

This invention relates to a control apparatus of a hybrid vehicle equipped with a driving motor and a generator to be driven by an engine (internal combustion engine).

BACKGROUND ART

In recent years, hybrid vehicles configured to obtain the driving force of the vehicle from a combination of a driving motor and an engine have been developed, and have increasingly found practical use. As hybrid vehicles, not only vehicles in which a generator is driven by an engine to generate electric power and a battery for supplying electric power to a driving motor is electrically charged with the generated power (PHV), but also vehicles in which the battery can be charged even by an external commercial power supply (PHEV) have been developed, and their practical use has been increased.

In some of the hybrid vehicles, an EV mode in which only the driving motor is used as a power source to drive driving wheels, a series mode in which the driving motor is used as a power source and the generator is driven by the engine to supply electric power to the battery or the driving motor, or a parallel mode in which both the engine and the driving motor are used as power sources is switched to one another depending on the traveling state of the vehicle, the charge state of the battery, or the like.

In an example of such hybrid vehicles, in accordance with the state of charge (SOC) of the battery such as a decrease in the remaining capacity of the battery during the EV travel mode, the travel mode is switched from the EV travel mode to the HV travel mode (corresponding to the above series mode or parallel mode), to actuate the engine, and the driving force of the engine is used to charge the battery or run the vehicle (see Patent Document 1).

PRIOR ART DOCUMENTS

Patent Documents

[Patent Document 1] JP-A-2010-083394

SUMMARY OF THE INVENTION

Problems to be Solved by the Invention

The hybrid vehicles include those which, if the remaining capacity of the battery is low, switch the travel mode from the EV mode to the series mode or the like for traveling, as mentioned above, and those which, if a required output required of the vehicle by a driver exceeds a threshold value set based on the upper limit output power of the battery, for example, switch the travel mode from the EV mode to the series mode or the like. That is, they are designed to switch the travel mode to the series mode or the like, if the output power of the battery alone is insufficient to obtain the required output.

With the above-mentioned hybrid vehicles, when the travel mode is switched from the EV mode to the series mode or the like, the temperature of an exhaust purification catalyst provided in the engine is lower than a predetermined temperature, and the exhaust purification catalyst is not activated, so that until the temperature of the exhaust purification catalyst rises to the predetermined temperature, an exhaust gas may fail to be purified sufficiently.

The present invention has been accomplished in the light of the above-described circumstances. It is an object of this invention to provide a control apparatus of a hybrid vehicle which, when the travel mode is switched from the EV mode to the series mode or the like, can warm an exhaust purification catalyst appropriately and suppress deterioration of an exhaust gas.

Means for Solving the Problems

The present invention for solving the above problems lies in a control apparatus of a hybrid vehicle, the hybrid vehicle including a driving motor, a battery for supplying electric power to the driving motor, an engine, and a generator driven by the engine for supplying electric power at least to the battery, the control apparatus adapted to control the hybrid vehicle and comprising: temperature detection means for detecting a temperature of an exhaust purification catalyst provided in the engine; output power detection means for detecting an upper limit output power of the battery; required output detection means for detecting a required output required of the vehicle; selection means that selects a first mode, in which the engine is driven, as a travel mode of the vehicle, if the required output is equal to or higher than a determination threshold value set based on the upper limit output power of the battery, or selects a second mode, in which the vehicle travels, with the engine being stopped, if the required output is lower than the determination threshold value; and threshold value changing means which lowers the determination threshold value, if the temperature of the exhaust purification catalyst is lower than a predetermined temperature.

With the present invention configured as above, if the temperature of the exhaust purification catalyst is lower than the predetermined temperature, the travel mode is apt to be switched from the second mode to the first mode, as compared with a case where the temperature of the exhaust purification catalyst is equal to or higher than the predetermined temperature. Thus, at a stage where the required output is relatively low, the temperature of the exhaust purification catalyst rises. Hence, deterioration of an exhaust gas due to travel in the first mode can be suppressed.

It is preferred for the threshold value changing means to lower the determination threshold value, in a range in which the upper limit output power of the battery is lower than a preset first power value.

In a region where the upper limit output power of the battery is equal to or higher than the first power value, namely, in a region where the upper limit output power is great, the required output minimally exceeds the first determination threshold value. Even when the temperature of the exhaust purification catalyst is low, therefore, the necessity of performing its warm-up is low. Consequently, in the range where the upper limit output power is equal to or higher than the first power value, the determination threshold value is not lowered, but the range where the second mode is selected is widened. By so doing, the unnecessary operation of the engine is suppressed, whereby fuel economy can be improved.

It is further preferred for the threshold value changing means to lower the determination threshold value, in a range where the upper limit output power of the battery is equal to or higher than a second power value which is lower than the first power value.

In a region where the upper limit output power of the battery is equal to or lower than the second power value (a region where the upper limit output power is relatively low), the required output frequently exceeds the first determination threshold value. As a result, the first mode is selected, and the engine is often operated. That is, even if the determination threshold value is not lowered, it is minimal for the temperature of the exhaust purification catalyst to become greatly lower than the predetermined temperature. By selecting the second mode in the region where the upper limit output power is equal to or lower than the second power value, therefore, the unnecessary operation of the engine is suppressed, whereby fuel economy can be improved.

It is also preferred for the threshold value changing means to lower the determination threshold value in a plurality of steps. By so doing, an increase in control load can be curtailed.

Preferably, the first mode includes a specific mode in which the engine is driven while being restricted to a predetermined load or lower. When the determination threshold value is lowered from a first determination threshold value to a second determination threshold value by the threshold value changing means, it is preferred for the selection means to select the first mode in which the generator is driven by the engine to generate power, if the required output is equal to or higher than the first determination threshold value; or select the second mode if the required output is equal to or lower than the second determination threshold value; or select the specific mode if the required output is lower than the first determination threshold value and higher than the second determination threshold value.

According to the above features, if the required output is lower than the first determination threshold value and higher than the second determination threshold value, the selection means selects the warm-up mode in which the engine is driven at a predetermined rotational speed (predetermined number of rotations) or lower. By so doing, the exhaust purification catalyst is appropriately warmed, before the required output exceeds the first determination threshold value, namely, before the series mode is selected. Thus, when the required output then exceeds the first determination threshold value, whereby the series mode is selected, an exhaust gas is satisfactorily purified by the exhaust purification catalyst.

When the specific mode is selected, the control apparatus preferably operates the engine under a constant load, irrespective of the required output. By so doing, control in the specific mode is facilitated, and noises due to load variations are also reduced.

When the specific mode is selected, it is also preferred for the control apparatus to continue the specific mode for a predetermined period of time, irrespective of the required output. Once the specific mode has been selected, therefore, the specific mode is continued for the predetermined time, for example, until the exhaust purification catalyst reaches the predetermined temperature or higher. Hence, the wasteful repeated stopping and operation of engine can be avoided, and the exhaust purification catalyst can be warmed up efficiently.

It is further preferred for the control apparatus to drive the generator via the engine in the case of the first mode including the specific mode, thereby performing power generation, and to keep down the amount of power generation by the generator in the specific mode as compared with the amount of power generation in the first mode other than the specific mode. Since power generation is kept down during the specific mode on this occasion, power can be generated even in the specific mode, and generated power can be charged into the battery. Thus, a decrease in the power storage amount of the battery can be curbed.

Effects of the Invention

With the control apparatus of a hybrid vehicle according to the present invention, mentioned above, when the travel mode is switched from the second mode to the first mode depending on the traveling state of the vehicle, the exhaust purification catalyst can be appropriately warmed, and deterioration of the exhaust gas can be suppressed.

MODE FOR CARRYING OUT THE INVENTION

An embodiment of the present invention will now be described in detail with reference to the accompanying drawings.

Figure 1:
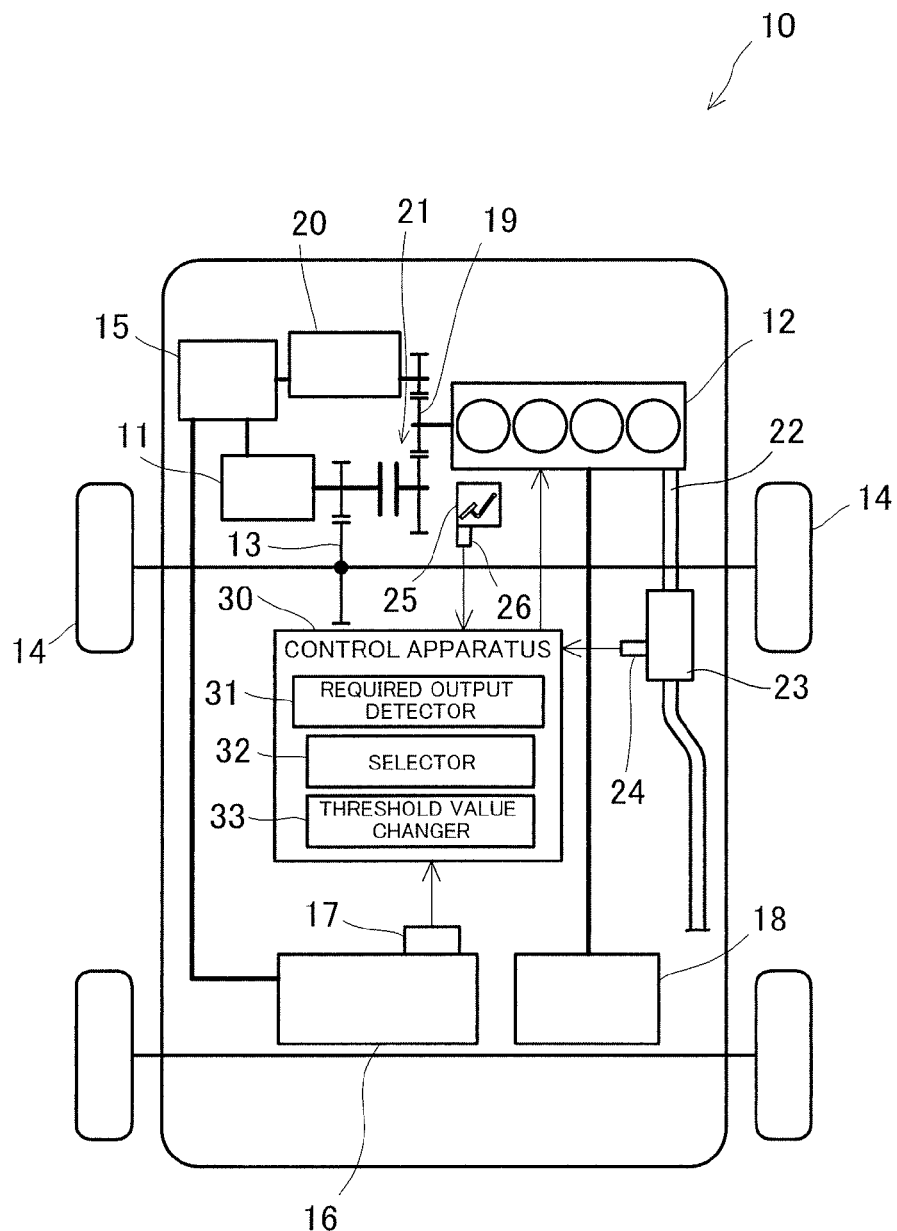
FIG. 1 is a schematic view showing an example of a hybrid vehicle loaded with a control apparatus according to the present invention.

As shown in FIG. 1, a hybrid vehicle (will hereinafter be referred to simply as "vehicle") 10 according to the present embodiment is equipped with a driving motor 11 and an engine 12 as drive sources for traveling. The driving force of the driving motor 11 is transmitted to front wheels 14 via a drive transmission mechanism 13. A battery 16 is connected to the driving motor 11 via an inverter (motor inverter) 15. The battery 16 is provided with a power detection unit (output power detection means) 17 for detecting the upper limit output power (output voltage and output current) of the battery 16.

The engine 12 is driven by the combustion of fuel supplied from a fuel tank 18. A generator (electric generator) 20 is connected to the engine 12 via an output system 19. The generator 20 is connected to the battery 16 via the inverter (generator inverter) 15. The output system 19 is connected to the generator 20, and is also connected to the drive transmission mechanism 13 via a clutch 21.

An exhaust purification catalyst 23, such as a three-way catalyst, is interposed in an exhaust pipe 22 of the engine 12. The exhaust purification catalyst 23 is provided with a temperature detection sensor 24 as a temperature detection means for detecting the temperature of the exhaust purification catalyst 23. The temperature detection means is not limited to the temperature detection sensor 24, but may be one which estimates the temperature of the exhaust purification catalyst 23.

Furthermore, the hybrid vehicle 10 is equipped with a control apparatus 30 for integrated control of various devices loaded on the vehicle 10. The control apparatus 30 is configured to include input/output devices, storage devices (ROM, RAM, etc.), a central processing unit (CPU), and a timer counter. The control apparatus 30 grasps the operating state of the vehicle 10 based on signals from various sensors provided in the vehicle 10, and controls the various devices comprehensively based on the operating state of the vehicle 10. As one of its control actions, the control apparatus 30, for example, performs the selection and switching of a travel mode in accordance with the traveling state of the vehicle 10.

The control apparatus 30 according to the present embodiment is equipped with a required output detection means 31, a selection means 32, and a threshold value changing means 33. The required output detection means 31 detects a required output required by the driver, for example, based on the detection results of an accelerator position sensor (APS) 26 which detects the opening of an accelerator pedal 25. In accordance with the traveling state of the vehicle 10 including the magnitude of the required output, the selection means 32 selects as the travel mode either a first mode in which the engine 12 is driven, or a second mode in which the vehicle travels, with the engine 12 being stopped. In the present embodiment, the selection means 32 selects the travel mode, which is an EV mode, a series mode, or a parallel mode, in accordance with the traveling state of the vehicle 10. The threshold value changing means 33 lowers the determination threshold value of the required output when the temperature of the exhaust purification catalyst 23 is lower than a predetermined temperature, as will be described in detail later.

The series mode and the parallel mode correspond to the first mode, because in these modes the engine 12 is driven for travelling. The EV mode corresponds to the second mode, because in this mode the engine 12 is stopped for travelling. In detail, the EV mode is the travel mode in which the engine 12 is kept to a halt and the driving motor 11 is operated as a drive source. The series mode is the travel mode in which the front wheels 14 are driven by the driving motor 11, and the generator 20 is operated by the engine 12, with the clutch 21 being disengaged, to generate power, whereupon the generated power is supplied to the battery 16, or to the battery 16 and the driving motor 11. The series mode includes a warm-up mode (specific mode) to be described later. The parallel mode is the travel mode in which the front wheels 14 are driven by the driving motor 11, and the front wheels 14 are also driven by the engine 12, with the clutch 21 in engagement.

In a travel region where the efficiency of the engine 12 is satisfactory, such as a high speed region where the vehicle 10 travels at a high speed, for example, the parallel mode is selected as the travel mode. In a travel region other than the region where the parallel mode is selected, namely, in a medium to low speed region, the EV mode or the series mode is appropriately selected as the travel mode in accordance with the traveling state of the vehicle 10.

In the travel region where the EV mode or the series mode is selected (i.e., medium to low speed region), as above, the selection means 32 selects either the EV mode or the series mode as the travel mode in accordance with the magnitude of the required output required of the vehicle 10 by the driver, which has been detected by the required output detection means 31. The method of detecting the required output required by the driver is not particularly limited. However, the required output can be easily found from the results of detection by the accelerator position sensor (APS) 26, because the required output is proportional to the opening of the accelerator.

Furthermore, the selection means 32 appropriately selects either the EV mode or the series mode as the travel mode in accordance with the temperature of the exhaust purification catalyst 23, as well as the required output required of the vehicle by the driver. In detail, the selection means 32, for example, determines whether or not the temperature of the exhaust purification catalyst 23 is equal to or higher than a predetermined temperature Te1, which has been preliminarily set, based on the detection results of the temperature detection sensor 24. Then, the selection means 32 changes selection criteria for the travel mode (EV mode or series mode), depending on a case where the temperature of the exhaust purification catalyst 23 is equal to or higher than the predetermined temperature Te1, or a case where this temperature is lower than the predetermined temperature Te1. That is, the selection means 32 changes the selection criteria for the travel mode, depending on a state where the exhaust purification catalyst 23 is substantially activated and its warm-up is unnecessary, or a state where the exhaust purification catalyst 23 is not activated and its warm-up is necessary.

Here, the exhaust purification catalyst 23, which is, for example, a three-way catalyst, has a low efficiency of purifying an exhaust gas, when its temperature is low and it is not activated. The three-way catalyst begins to be activated at a temperature of the order of about 300° C. and, from this temperature onward, purifies the exhaust gas. Until its temperature reaches about 420° C., however, its activation is insufficient and its exhaust gas purification efficiency is low. Thus, the above-mentioned predetermined temperature Te1 is set at a temperature (e.g., a temperature of the order of 400° C.) which is slightly lower than the temperature at which the exhaust purification catalyst 23 is activated (for example, 420° C.). It goes without saying that the predetermined temperature Te1 is not particularly limited, but may be determined as appropriate.

When the temperature of the exhaust purification catalyst 23 is equal to or higher than the predetermined temperature Te1, the selection means 32 judges that the exhaust purification catalyst 23 is in a substantially activated state, namely, a state where warm-up of the exhaust purification catalyst 23 is not necessary. Based on this judgment, the selection means 32 selects the travel mode conformed to this state. When the temperature of the exhaust purification catalyst 23 is lower than the predetermined temperature Te1, the selection means 32 judges that the exhaust purification catalyst 23 is in a state where its warm-up is needed. Based on this judgment, the selection means 32 selects the travel mode conformed to this state.

Figure 2A:
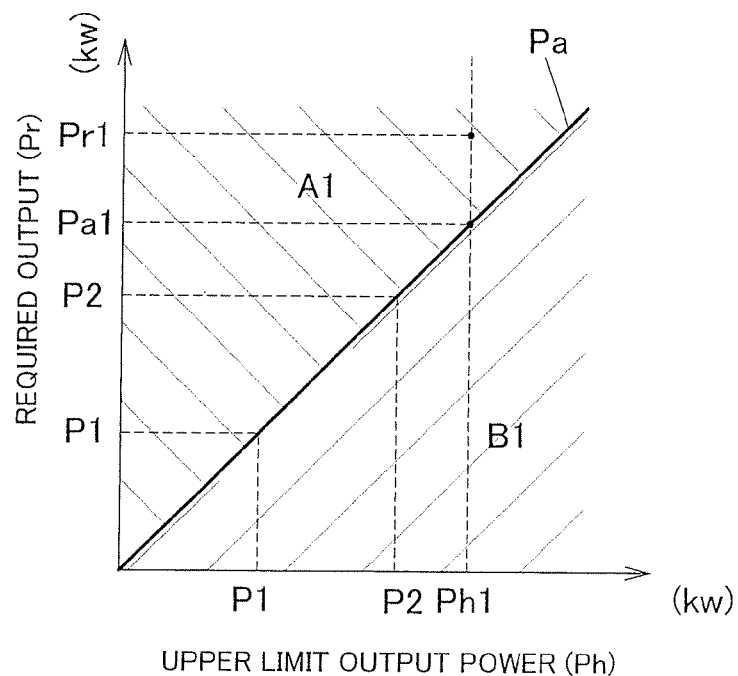
FIGS. 2A, 2B are views showing an exemplary map for use in the selection of a travel mode, the views defining the relation between the upper limit output power of a battery and a required output (determination threshold value).
Figure 2B:
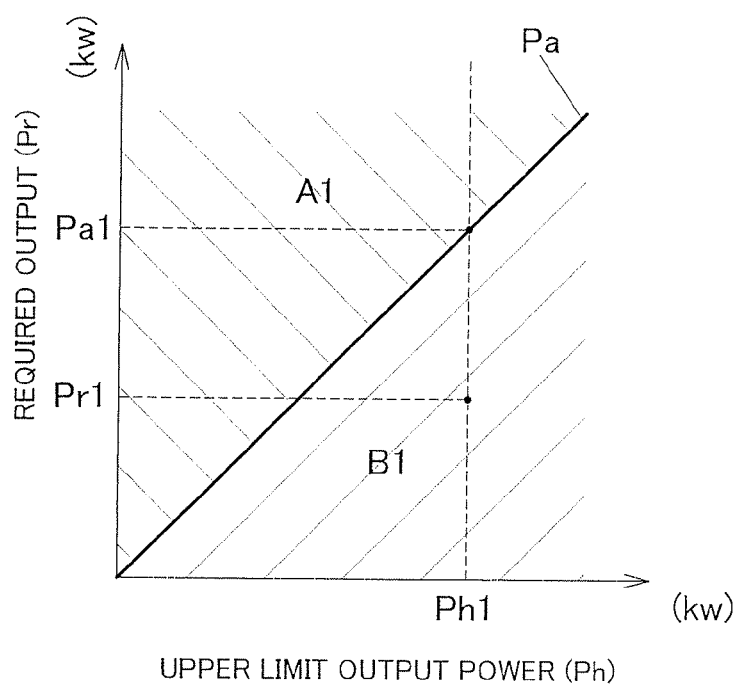

In the present embodiment, the control apparatus 30, for example, stores a travel mode determination map shown in FIGS. 2A, 2B. When the temperature of the exhaust purification catalyst 23 is equal to or higher than the predetermined temperature Te1, the selection means 32 uses this map to select one of the EV mode and the series mode (including the warm-up mode) as the travel mode.

The map shown in FIGS. 2A, 2B is a map used when the temperature of the exhaust purification catalyst is equal to or higher than the predetermined temperature. This map defines the relationship between the upper limit output power of the battery and the determination threshold value of the required output. In other words, FIGS. 2A, 2B define the region of the travel mode determined by the upper limit output power of the battery and the magnitude of the required output.

Here, the upper limit output power of the battery 16 is the upper limit value of the output power which the battery can output to the driving motor 11, and is detected by the power detection unit 17. The upper limit output power of the battery 16 tends to lower, for example, as the degree of deterioration of the battery 16 increases. The upper limit output power of the battery 16 also tends to lower, for example, as the temperature of the battery 16 lowers. Further, the upper limit output power of the battery 16 tends to lower, for example, as the charging rate (SOC) of the battery 16 lowers.

As noted above, the upper limit output power of the battery 16 changes, as appropriate, in accordance with the state of the battery 16. Thus, the determination threshold value of the required output is set at a different value in response to a change in the upper limit output power of the battery 16. Concretely, in the map of FIGS. 2A, 2B used when the temperature Te of the exhaust purification catalyst 23 is equal to or higher than the predetermined temperature Te1, the determination threshold value of the required output Pr (i.e., a first determination threshold value Pa) is set at nearly the same value as the upper limit output power Ph of the battery 16. In this example, therefore, when the upper limit output power Ph is P1, the determination threshold value (the first determination threshold value Pa) is P1 and, when the upper limit output power Ph is P2, the determination threshold value (the first determination threshold value Pa) is P2. A region A1 where the required output Pr required by the driver is equal to or greater than the determination threshold value (the first determination threshold value Pa) is set as a region for the selection of the series mode, while a region B1 where the required output Pr is lower than the determination threshold value (the first determination threshold value Pa) is set as a region for the selection of the EV mode.

Figure 3A:
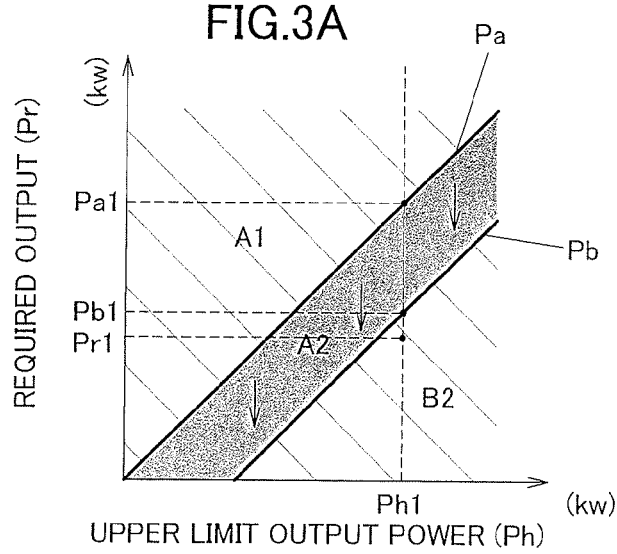
FIGS. 3A to 3C are views showing another exemplary map for use in the selection of the travel mode, the views defining the relation between the upper limit output power of the battery and the required output (determination threshold value).
Figure 3B:
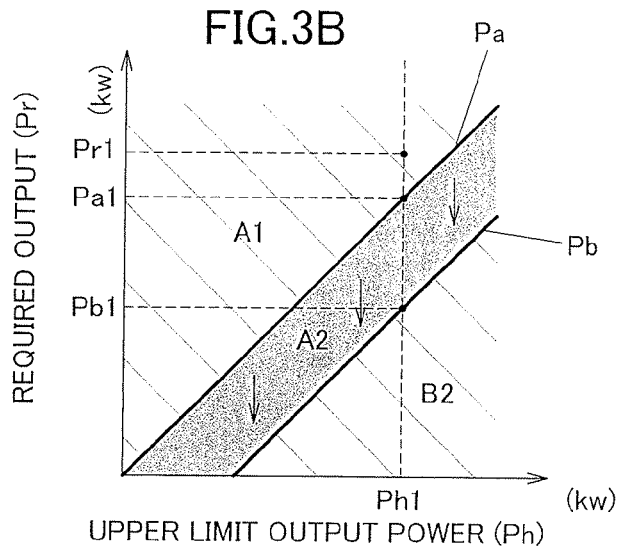
Figure 3C:
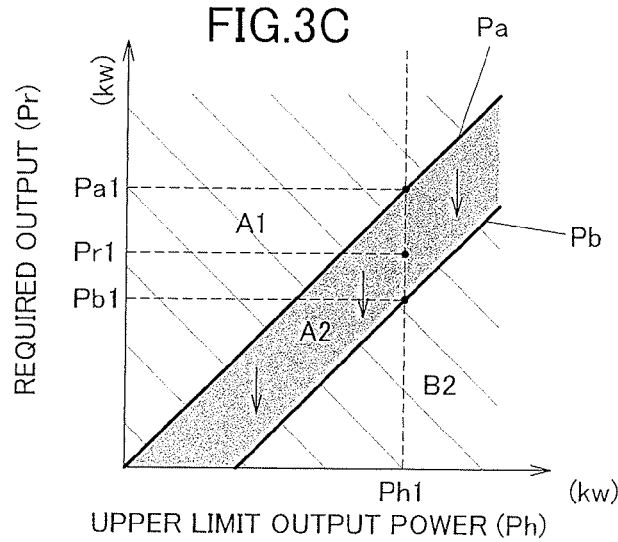

When the temperature Te of the exhaust purification catalyst 23 is lower than the predetermined temperature Te1, on the other hand, the threshold value changing means 33 lowers the determination threshold value (the first determination threshold value Pa) of the required output Pr. The map shown in FIGS. 3A to 3C is a map showing a state in which the determination threshold value is lowered by the threshold value changing means 33. In the present embodiment, the determination threshold value (the first determination threshold value Pa) is lowered to a second determination threshold value Pb by the threshold value changing means 33.

In this case, a region A1 where the required output Pr is equal to or higher than the determination threshold value (the first determination threshold value Pa) before lowering is set as a region for selection of the series mode, and a region B2 where the required output Pr is equal to or lower than the determination threshold value (a second determination threshold value Pb) after lowering is set as a region for selection of the EV mode. Further, a region A2 where the required output Pr is lower than the first determination threshold value Pa and higher than the second determination threshold value Pb is set as a region for selection of the warm-up mode. The second determination threshold value Pb may be a value smaller than the first determination threshold value Pa, and may be decided on, as appropriate, in consideration of the characteristics, etc. of the battery 16.

When the temperature of the exhaust purification catalyst 23 is lower than the predetermined temperature Te1, the selection means 32 judges that the exhaust purification catalyst 23 is in a state where its warm-up is needed. Based on this judgment, the selection means 32 selects the travel mode conformed to this state. Concretely, the selection means 32 selects either the EV mode or the series mode (including the warm-up mode) as the travel mode by use of the map shown in FIGS. 3A to 3C.

The warm-up mode (specific mode) is the mode in which the driving motor 11 is operated, and the engine 12 is driven, with the clutch 21 out of engagement. This mode is included in the series mode (first mode), but is a mode in which the engine 12 is restricted to a predetermined load or less, or the number of rotations of the engine 12 (i.e., rotational speed of the engine) is restricted to a predetermined number of rotations or lower. That is, in the warm-up mode, the engine 12 is driven to such a degree as not to substantially contribute to charging of the battery 16, whereby the temperature of the exhaust purification catalyst 23 is raised.

The warm-up mode (specific mode) is executed continuously for a predetermined time, with the engine 12 being under a constant load or at a constant rotational speed, irrespective of the required output required of the vehicle 10. When the temperature of the exhaust purification catalyst 23 becomes a predetermined temperature or higher, for example, the predetermined temperature Te1 or higher, the warm-up mode is released. Thus, variations in the load or rotational speed of the engine during the warm-up mode can be suppressed. Consequently, it becomes possible to warm up the exhaust purification catalyst 23 efficiently, while avoiding noises or vibrations associated with variations in the load or rotational speed of the engine 12.

In the warm-up mode, moreover, power may be generated by the generator utilizing the load of the engine 12. However, the amount of power generation in the warm-up mode (specific mode) is kept down as compared with the amount of power generation in the series mode (first mode) other than the warm-up mode (specific mode). The state "kept down" refers to a concept including a state where no power is generated.

An example of selection control (switching control) of the EV mode, the series mode, or the warm-up mode by the selection means 32 will hereinafter be explained by reference to a flowchart of FIG. 4.

Figure 4:
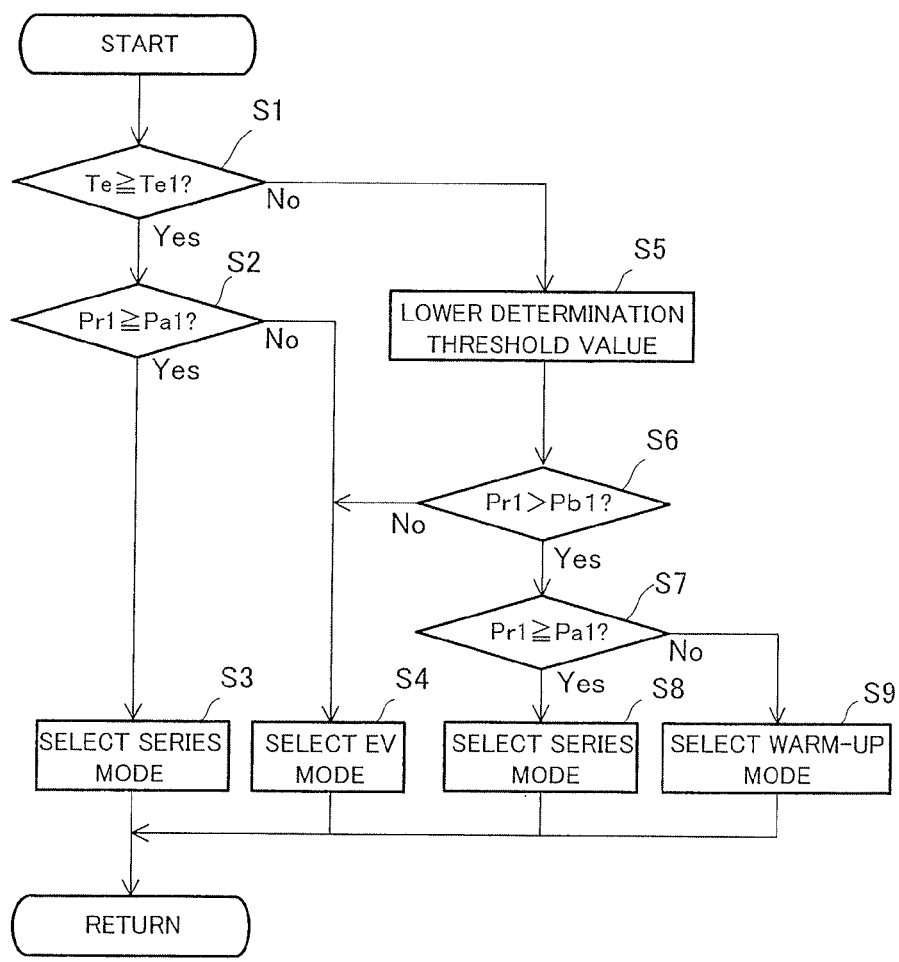
FIG. 4 is a flowchart illustrating an example of travel mode switching control according to the present invention.

As shown in the flowchart of FIG. 4, the selection means 32 judges, first of all in Step S1, whether or not the temperature Te of the exhaust purification catalyst 23 is equal to or higher than the predetermined temperature Te1. If the temperature Te of the exhaust purification catalyst 23 is equal to or higher than the predetermined temperature Te1 (Step S1: Yes), it is determined from the map shown in FIGS. 2A, 2B whether or not the required output Pr required by the driver is equal to or higher than the determination threshold value (first determination threshold value Pa). For example, when the current upper limit output power Ph of the battery 16 is Ph1 and the required output Pr required by the driver is Pr1, as shown in FIGS. 2A, 2B, the first determination threshold value Pa1 corresponding to the upper limit output power Ph1 is found, and a determination is made as to whether or not the driver's required output Pr1 is equal to or higher than this first determination threshold value Pa1 (Step S2).

If the required output Pr1 is equal to or higher than the first determination threshold value Pa1 (Step S2: Yes), as shown in FIG. 2A, the selection means 32 selects the series mode as the travel mode (Step S3). On the other hand, if the driver's required output Pr1 is lower than the first determination threshold value Pa1 (Step S2: No), as shown in FIG. 2B, the selection means 32 selects the EV mode as the travel mode (Step S4).

If, in Step S1, the temperature of the exhaust purification catalyst 23 is lower than the predetermined temperature Te1 (Step S1: No), the program proceeds to Step S5, in which the threshold value changing means 33 lowers the determination threshold value (first determination threshold value Pa) of the required output. In the present embodiment, the threshold value changing means 33 lowers the determination threshold value (first determination threshold value Pa) to the second determination threshold value Pb. Then, the selection means 32 determines the magnitude relationship between the driver's required output Pr and the determination threshold value (the first determination threshold value Pa and the second determination threshold value Pb) by use of the map (see FIGS. 3A to 3C) in which the determination threshold value has been lowered. For example, when the upper limit output power of the battery 16 is currently Ph1, and the driver's required output Pr is currently Pr1, the first determination threshold value Pa1 and the second determination threshold value Pb1 corresponding to the upper limit output power Ph1 are found, and the magnitude relationship between the required output Pr1 and the first determination threshold value Pa1/the second determination threshold value Pb1 is determined.

Firstly, in Step S6, it is determined whether or not the required output Pr1 is greater than the second determination threshold value Pb1. If the required output Pr1 is equal to or lower than the second determination threshold value Pb1 (Step S6: No), as shown in FIG. 3A, the selection means 32 selects the EV mode as the travel mode (Step S4). If the required output Pr1 is larger than the second determination threshold value Pb1 (Step S6: Yes), it is further determined, in Step S7, whether or not the required output Pr1 is equal to or higher than the determination threshold value before lowering (the first determination threshold value Pa1). If the required output Pr1 is equal to or higher than the first determination threshold value Pa1 (Step S7: Yes), as shown in FIG. 3B, the selection means 32 selects the series mode as the travel mode (Step S8). Moreover, if the required output Pr1 is lower than the determination threshold value (the first determination threshold value Pa1) (Step S7: No), that is, if the required output Pr1 is lower than the first determination threshold value Pa1 and higher than the second determination threshold value Pb1, as shown in FIG. 3C, the selection means 32 selects the warm-up mode, which is included in the series mode, as the travel mode (Step S9).

With the control apparatus 30 according to the present invention, as described above, when the required output increases, with the temperature of the exhaust purification catalyst 23 being lower than the predetermined temperature, the travel mode is shifted from the EV mode to the series mode. On this occasion, the travel mode is first shifted to the warm-up mode. During the travel in the warm-up mode, the temperature of the exhaust purification catalyst 23 is raised. By so doing, the exhaust purification catalyst 23 is activated, and during the activation process, shift to the ordinary series mode can be carried out. Thus, regardless of the temperature of the exhaust purification catalyst, an exhaust gas can be properly purified by the exhaust purification catalyst 23, when the travel mode is shifted from the EV mode to the series mode.

Figure 5:
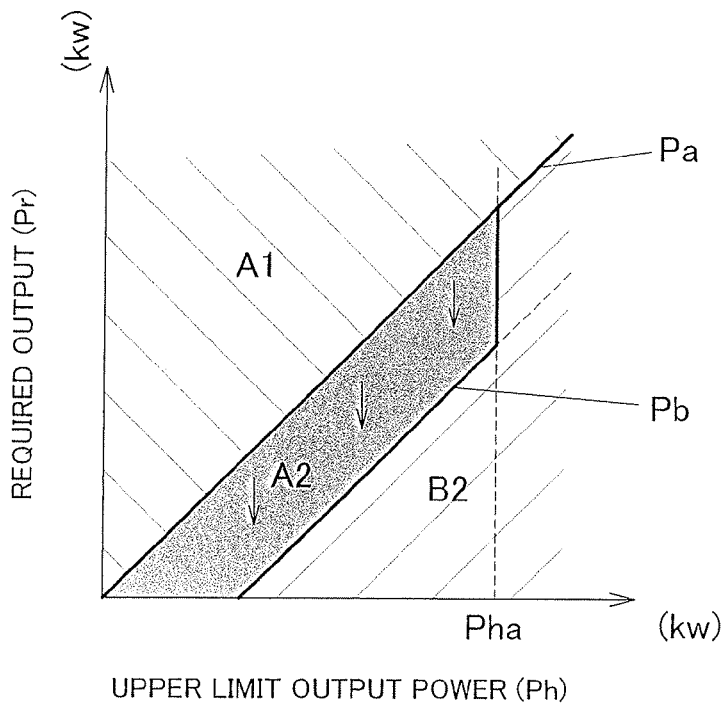
FIG. 5 is a view showing still another exemplary map for use in the selection of the travel mode.

In the present embodiment, if the temperature Te of the exhaust purification catalyst 23 is lower than the predetermined temperature Te1, the warm-up mode is first selected when the series mode is to be selected (see FIGS. 3A to 3C), irrespective of the magnitude of the upper limit output power of the battery 16. However, in a range where the upper limit output power Ph of the battery 16 is equal to or higher than a first power value Pha, for example, as shown in FIG. 5, it is permissible for the selection means 32 not to select the warm-up mode, without lowering of the determination threshold value (first determination threshold value Pa) by the threshold value changing means 33. That is, the threshold value changing means 33 may lower the determination threshold value, in a range where the upper limit output power of the battery 16 is lower than the first power value Pha. By so doing, wasteful operation of the engine 12 can be suppressed to improve fuel economy.

In the range where the upper limit output power Ph of the battery 16 is equal to or higher than the first power value Pha, the upper limit output power Ph of the battery 16 is considerably high. Thus, the driver's required output Pr minimally increases to a range where the series mode is selected, that is, to the determination threshold value (first determination threshold value Pa) or higher. When the upper limit output power Ph is equal to or higher than the first power value Pha, therefore, the necessity for considering the deterioration of the exhaust gas is low.

Figure 6:
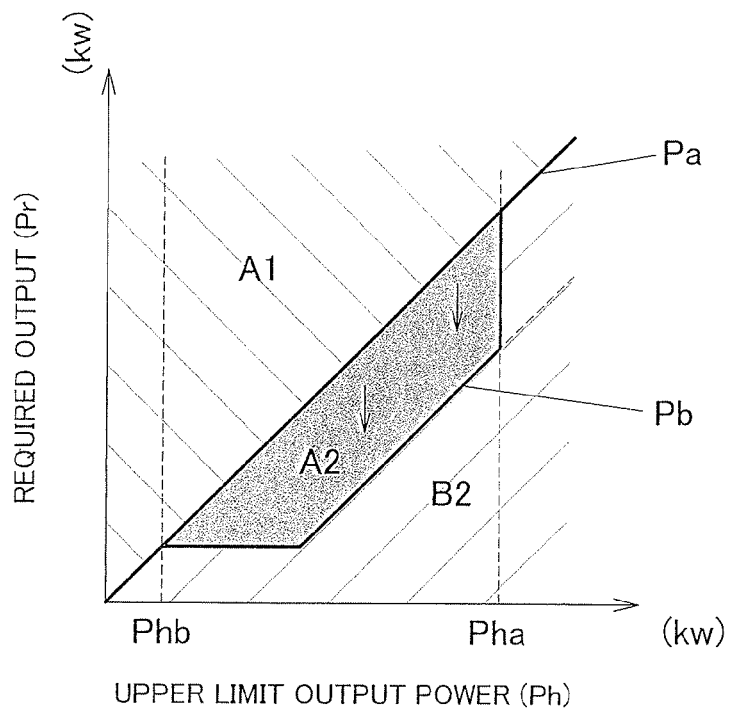
FIG. 6 is a view showing a further exemplary map for use in the selection of the travel mode.

Moreover, even in a range where the upper limit output power Ph of the battery 16 is equal to or lower than a second power value Phb which is lower than the first power value Pha, as shown in FIG. 6, it is permissible for the selection means 32 not to select the warm-up mode, without lowering of the determination threshold value (first determination threshold value Pa) of the required output Pr by the threshold value changing means 33. That is, the threshold value changing means 33 may lower the determination threshold value (first determination threshold value Pa), in a range where the upper limit output power Ph of the battery 16 is equal to or higher than the second power value Phb. By so doing, unnecessary operation of the engine 12 is suppressed, whereby a further improvement in fuel economy can be achieved.

In the region where the upper limit output power Ph of the battery 16 is equal to or lower than the second power value Phb (the region where the upper limit output power is relatively small), the required output Pr is apt to exceed the first determination threshold value Pa, resulting in the selection of the series mode, and the engine 12 tends to be frequently operated. Thus, it rarely occurs for the temperature Te of the exhaust purification catalyst 23 to become much lower than the predetermined temperature Te1. The necessity of warming the exhaust purification catalyst 23 is also low.

Figure 7:
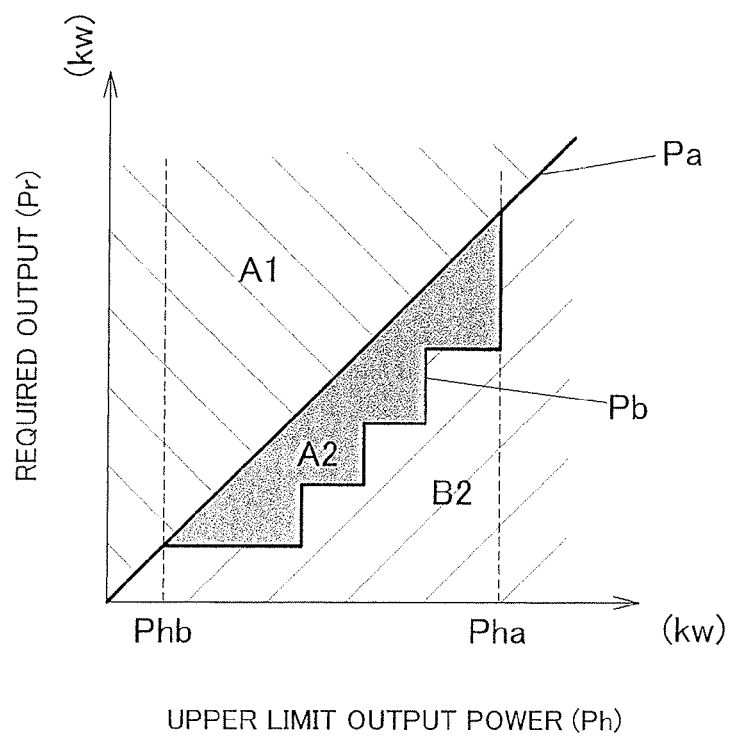
FIG. 7 is a view showing a still further exemplary map for use in the selection of the travel mode.

In the present embodiment, an explanation has been offered for an example in which when the determination threshold value (first determination threshold value Pa) of the required output Pr by the driver is lowered by the threshold value changing means 33, a linear determination threshold value (second determination threshold value Pb) conformed to a change in the upper limit output power Ph of the battery 16 is set. However, the determination threshold value (second determination threshold value Pb) may be set to change in a plurality of steps, for example, as shown in FIG. 7. By so doing, increases in the control load can be curtailed.

In the present embodiment, moreover, if the temperature Te of the exhaust purification catalyst 23 is lower than the predetermined temperature Te1, the warm-up mode is selected, in the region A2 where the required output is lower than the first determination threshold value Pa and higher than the second determination threshold value Pb (see FIG. 3C). In this region A2, however, the warm-up mode need not necessarily be selected, but the ordinary series mode may be selected, as in the region A1. Even in this case, the required output is lower in the region A2 than in the region A1, and the rotational speed (number of rotations) of the engine 12 is kept relatively low in the region A2 in comparison with the region A1. Even if the ordinary series mode is selected in the region A2, therefore, deterioration of the exhaust gas can be suppressed, and the temperature of the exhaust purification catalyst 23 can be raised properly.

The present invention has been described above in regard to the one embodiment thereof. However, it is to be understood that the present invention is in no way limited to this embodiment, but can be changed or modified, as appropriate, without departing from its spirit and scope.

EXPLANATIONS OF LETTERS OR NUMERALS

10 Hybrid vehicle
11 Driving motor
12 Engine
13 Drive transmission mechanism
14 Front wheel
15 Inverter
16 Battery
17 Power detection unit (output power detector)
18 Fuel tank
19 Output system
20 Generator
21 Clutch
21 Exhaust pipe
22 Exhaust purification catalyst
23 Temperature detection sensor (temperature detector)
24 Accelerator pedal
25 Accelerator position sensor
30 Control apparatus
31 Required output detector (Required output detection means)
32 Selector (Selection means)
33 Threshold value changer (Threshold value changing means)

The invention claimed is:

1. A hybrid vehicle, comprising:
a driving motor;
a battery for supplying electric power to the driving motor;
an engine;
a generator driven by the engine for supplying electric power at least to the battery;
a temperature sensor which detects a temperature of an exhaust purification catalyst provided in the engine;
an output power sensor which detects an upper limit output power of the battery;
an accelerator position sensor which detects a required output required of the vehicle; and
a controller and a storage storing a program that causes the controller to:
select a first mode, in which the engine is driven, as a travel mode of the vehicle, if the detected required output is equal to or higher than a determination threshold value set based on the detected upper limit output power of the battery, or select a second mode, in which the vehicle travels, with the engine being stopped, if the detected required output is lower than the determination threshold value; and
lower the determination threshold value, if the detected temperature of the exhaust purification catalyst is lower than a predetermined temperature,
wherein in the determination threshold lowering step, the determination threshold value is lowered only within a range of the upper limit output power of the battery in which the upper limit output power is lower than a preset first power value.

2. The hybrid vehicle according to claim 1, wherein the program further causes the controller to:
lower the determination threshold value, in a range where the upper limit output power of the battery is equal to or higher than a second power value which is lower than the first power value.

3. The hybrid vehicle according to claim 1, wherein the program further causes the controller to:
lower the determination threshold value in a plurality of steps.

4. The hybrid vehicle according to claim 1, wherein when the determination threshold value is lowered from a first determination threshold value to a second determination threshold value in the lowering step, the program further causes the controller to:
select the first mode in which the generator is driven by the engine to generate power, if the required output is equal to or higher than the first determination threshold value; or
select the second mode if the required output is equal to or lower than the second determination threshold value; or
select selects the specific mode if the required output is lower than the first determination threshold value and higher than the second determination threshold value.

5. The hybrid vehicle according to claim 2, wherein when the determination threshold value is lowered from a first determination threshold value to a second determination threshold value in the lowering step, the program further causes the controller to:
select the first mode in which the generator is driven by the engine to generate power, if the required output is equal to or higher than the first determination threshold value; or
select the second mode if the required output is equal to or lower than the second determination threshold value; or
select the specific mode if the required output is lower than the first determination threshold value and higher than the second determination threshold value.

6. The hybrid vehicle according to claim 4, wherein when the specific mode is selected, the program causes the controller to operate the engine under a constant load, irrespective of the required output.

7. The hybrid vehicle according to claim 5, wherein when the specific mode is selected, the program causes the controller to operate the engine under a constant load, irrespective of the required output.

8. The hybrid vehicle according to claim 4, wherein when the specific mode is selected, the program causes the controller continue the specific mode for a predetermined period of time, irrespective of the required output.

9. The hybrid vehicle according to claim 5, wherein
when the specific mode is selected, the program causes the controller to continue the specific mode for a predetermined period of time, irrespective of the required output.

10. The hybrid vehicle according to claim 6, wherein
when the specific mode is selected, the program causes the controller to continue the specific mode for a predetermined period of time, irrespective of the required output.

11. The hybrid vehicle according to claim 4, wherein
the program further causes the controller to:
drive the generator via the engine in a case of the first mode including the specific mode, thereby performing power generation, and
keep down an amount of power generation by the generator in the specific mode as compared with an amount of power generation in the first mode other than the specific mode.

12. The hybrid vehicle according to claim 5, wherein
the program further causes the controller to:
drive the generator via the engine in a case of the first mode including the specific mode, thereby performing power generation, and
keep down an amount of power generation by the generator in the specific mode as compared with an amount of power generation in the first mode other than the specific mode.

13. The hybrid vehicle according to claim 6, wherein
the program further causes the controller to:
drive the generator via the engine in a case of the first mode including the specific mode, thereby performing power generation, and
keep down an amount of power generation by the generator in the specific mode as compared with an amount of power generation in the first mode other than the specific mode.

14. The control apparatus of a hybrid vehicle according to claim 8, wherein
the program further causes the controller to:
drive the generator via the engine in a case of the first mode including the specific mode, thereby performing power generation, and
keep down an amount of power generation by the generator in the specific mode as compared with an amount of power generation in the first mode other than the specific mode.

15. A hybrid vehicle, comprising:
a driving motor;
a battery for supplying electric power to the driving motor;
an engine;
a generator driven by the engine for supplying electric power at least to the battery;
a temperature sensor which detects a temperature of an exhaust purification catalyst provided in the engine;
an output power sensor which detects an upper limit output power of the battery;
an accelerator position sensor which detects a required output required of the vehicle; and
a controller and a storage storing a program that causes the controller to:
select a first mode, in which the engine is driven, as a travel mode of the vehicle, if the detected required output is equal to or higher than a determination threshold value set based on the detected upper limit output power of the battery, or select a second mode, in which the vehicle travels, with the engine being stopped, if the detected required output is lower than the determination threshold value; and
lower the determination threshold value, if the detected temperature of the exhaust purification catalyst is lower than a predetermined temperature, wherein
the first mode includes a specific mode in which the engine is driven while being restricted to a predetermined load or lower, and
when the determination threshold value is lowered from a first determination threshold value to a second determination threshold value in the lowering step, the program further causes the controller to:
select the first mode in which the generator is driven by the engine to generate power, if the required output is equal to or higher than the first determination threshold value; or
select the second mode if the required output is equal to or lower than the second determination threshold value; or
select selects the specific mode if the required output is lower than the first determination threshold value and higher than the second determination threshold value.

16. The hybrid vehicle according to claim 15, wherein
when the specific mode is selected, the program causes the controller to operate the engine under a constant load, irrespective of the required output.

17. The hybrid vehicle according to claim 15, wherein
when the specific mode is selected, the program causes the controller continue the specific mode for a predetermined period of time, irrespective of the required output.

18. The hybrid vehicle according to claim 15, wherein
the program further causes the controller to:
drive the generator via the engine in a case of the first mode including the specific mode, thereby performing power generation, and
keep down an amount of power generation by the generator in the specific mode as compared with an amount of power generation in the first mode other than the specific mode.

* * * * *